Aug. 9, 1966   B. F. BROOKER   3,264,884
ACTUATING UNIT FOR VALVES OR SWITCHES
Filed Aug. 30, 1963

INVENTOR
Bernard F. Brooker

By Watson, Cole, Grindle & Watson
ATTORNEYS 3,264,884
ACTUATING UNIT FOR VALVES OR SWITCHES
Bernard Frederick Brooker, Crawley, Sussex, England, assignor to Premier Injection Mouldings Limited, Sussex, England, a company of Great Britain
Filed Aug. 30, 1963, Ser. No. 305,636
Claims priority, application Great Britain, Sept. 5, 1962, 34,039/62
4 Claims. (Cl. 74—17.8)

This invention relates to an actuator device for catches, valves or switches, and has for its object to provide as a single unit an actuator which has a quick action movement and which may itself embody the valve and fluid seal when the device is required for controlling water or other fluid.

It is intended hereafter that the term "diaphragm" indicates the connecting element or elements between the rim flange and the stem, whether provided with apertures or not.

According to the invention there is provided an actuator unit comprising a movable stem capable of being held in either of two operating positions by pressure from a diaphragm, the stem extending from both sides of the diaphragm and being movable from one position to the other by distortion of the diaphragm.

One of the stem portions may be constituted as, or provided with, operating means such as a handle, push-pull button, or link, and the other stem portion may be formed as the valve or the switch engaging member, and may include a screw or telescopic arrangement for varying the operating stroke so as to give a variable flow in the case of a valve, or a variable switch movement in the case of a switch.

The stem portions may terminate in tapered attachment heads at the centre of the diaphragm, the apices of the heads being of small area in relation to the diameter of the diaphragm, e.g. in the ratio between 1:8 to 1:10, so as to give clearance to, and not impair, the flexibility of the diaphragm.

One material which gives strength and flexibility with desired mouldability is a plastic known as "polypropylene," and enables the components of the unit to be moulded in one piece by injection moulding processes.

To provide adequate flexibility as between the diaphragm and its rim flange, the connection therebetween is preferably very thin and of a line character, with the walls of the flange sloping away therefrom on either side of the line joint.

Figure 1:
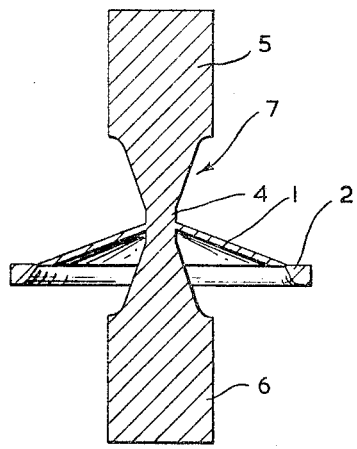
Figure 3A:
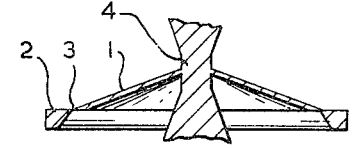
Figure 3B:
Figure 2:
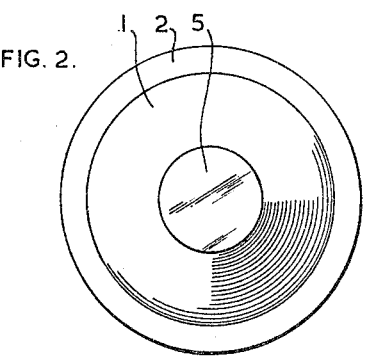
Figure 3C:
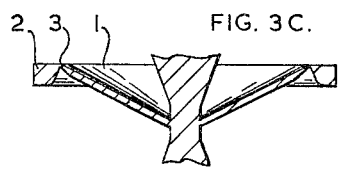
Figure 4:
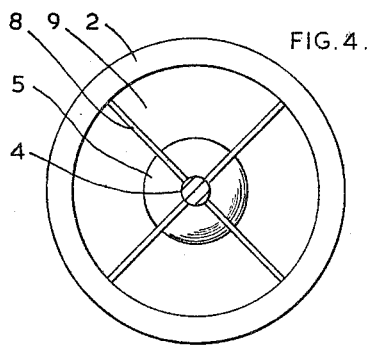
Figure 5:
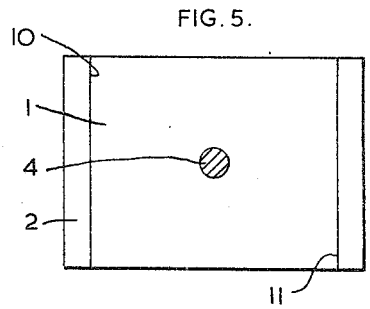

One embodiment of the invention will now be described by way of example only with reference to the accompanying drawings in which:

FIGURE 1 is a sectional view.
FIGURE 2 is a plan view.
FIGURES 3a, 3b and 3c show the relative positions taken up by the stem and diaphragm in changing from one position to another.
FIGURE 4 is a plan view of a further embodiment.
FIGURE 5 is a plan view of a still further embodiment.

The embodiment shown in FIGURES 1, 2, 3A, 3B, and 3C is particularly adapted as a valve unit for controlling liquid in a pipe line such as, for example, the inlet line of a motor car heater.

The diaphragm 1 in this embodiment is cone shaped and has a taper of between 18 to 20 degrees according to the stroke of the valve movement required, the perimeter edge or line joint of the diaphragm 1 terminating in a rim flange 2. This rim flange 2 is shaped so as to parallel a seating of a locating surface of a housing to which the valve may be inserted. The thickness of the diaphragm 1 may be between 0.015 and 0.020 inch, while the width and thickness of the flange may be as convenient, for example, of the order of ten times the thickness of the diaphragm. To ensure a line joint connection 3 between the diaphragm perimeter and the flange, the diaphragm may be tapered to its circular perimeter, and may have a diameter of approximately one inch.

The centre apex of the diaphragm has an area 4 which may be between 0.1 to 0.125 square inch in cross section to which on opposite sides portions 5, 6 of the stem 7 are attached to one another, one of the stem portions operating as a head button or other suitable member, while the other is constituted as the valve.

The whole unit may be injection moulded in one piece from "polypropylene" or a high density polythene and is adapted to fit in a housing having liquid inlet and outlet channels with an intervening control channel in which the valve stem is a sliding fit to control—according to the position of the diaphragm—the opening between the channels, the cross-sectional area of the valve stem portion being greater than the cross-sectional area of the said channels. The housing has a cylindrical flange, on the edge of which the perimeter rim flange 2 is adapted to seat, and this rim 2 may be compressed to provide a liquid seal by clamping down a closing cap provided with an opening through which projects the operating stem of the unit.

Thus in one position of the diaphragm, depression of the operating stem portion flexes the diaphragm as shown in FIGURES 3a, 3b and 3c to cause it to snap over the dead centre of the perimeter joint line, so that the valve stem is correspondingly moved to open or close the valve (fully or partially) as the case may be. When the operating stem is urged in the opposite direction, the reverse action occurs.

If a variable liquid flow control is desired a screw arrangement may be incorporated in the valve stem, possibly by means (not shown) of a screw passing wholly or partially along the longitudinal axis of the stem.

Turning to FIGURE 4 there is seen a similar unit in which the diaphragm 1 is in the form of a spider arrangement 8 having a number of apertures 9 therein. This unit may be particularly useful in a switch.

FIGURE 5 is a further embodiment in which the diaphragm is in the form of a rectangle. In this embodiment the rim flange 2 does not encircle the whole perimeter of the diaphragm but merely extends along two opposite edges 10, 11. A unit of this type is envisaged as being particularly useful in relation to locks or switchgear.

While the unit of the invention is particularly suitable to being manufactured in one piece by an injection moulding process using thermoplastics, particularly polypropylene and the high density and low density polyethylenes, the various integers may be manufactured separately and assembled afterwards. Thus it has been found practical to manufacture these units in large quantities at minimum cost. The unit may be used widely in high temperature gaseous and liquid control and in such fields as switches, catches, locks, domestic radiators and cooling units incorporating thermostatic control.

What I claim is:
1. An actuator device which includes a rim portion adapted to be clamped between two fixed members, a resilient bowed portion connected to the rim portion by a thin joint structure, and a stem portion connected to the resilient portion by which the resilient portion can be moved axially with respect to the rim portion to distort and snap through the plane of the rim portion from one stable position to another stable position, the rim portion, resilient portion, joint and stem portion, being moulded in one piece of a synthetic plastic material, and outer marginal portions of said resilient portion being bevelled to provide outwardly convergent surfaces, and the inner edge portions of the rim portion being bevelled to provide inwardly convergent surfaces thereon, the apices of said respective convergent surfaces meeting to form said thin joint structure, whereby said joint is substantially thinner than the thickness of the diaphragm.

2. The actuator device as set forth in claim 1 in which said rim portion is annular, said resilient bowed portion comprises a diaphragm of conical shape enclosed by said rim portion, and said stem portion projects axially from the center of the diaphragm.

3. The actuator device as set forth in claim 1 in which said rim portion comprises two parallel spaced apart sections, and said resilient bowed portion comprises a diaphragm extending between said two rim sections.

4. The actuator device as set forth in claim 1 in which said resilient bowed portion comprises a multiple-armed spider structure extending across said rim portion, the ends of the arms of said spider structure and the adjacent parts of said rim portion being the tapered portions connected by said thin joint structure.

References Cited by the Examiner
UNITED STATES PATENTS

| | | | |
|---|---|---|---|
| 2,368,193 | 1/1945 | Boynton | 267—1 |
| 2,521,891 | 9/1950 | Beams | 251—75 |
| 2,561,405 | 7/1951 | O'Brien et al. | 267—1 |
| 2,860,208 | 11/1958 | Epstein | 267—1 |
| 2,893,416 | 7/1959 | Hegstad | 251—75 X |
| 3,112,768 | 12/1963 | Thompson | 251—75 X |

MILTON KAUFMAN, *Primary Examiner.*